May 15, 1928.

E. F. MAAS 1,669,620

TREAD APPLYING DEVICE

Filed June 30 1926

INVENTOR

Elov. F. Maas.

BY

ATTORNEY

May 15, 1928.

E. F. MAAS 1,669,620

TREAD APPLYING DEVICE

Filed June 30 1926

INVENTOR
Elov.F.Maas.
BY
ATTORNEY

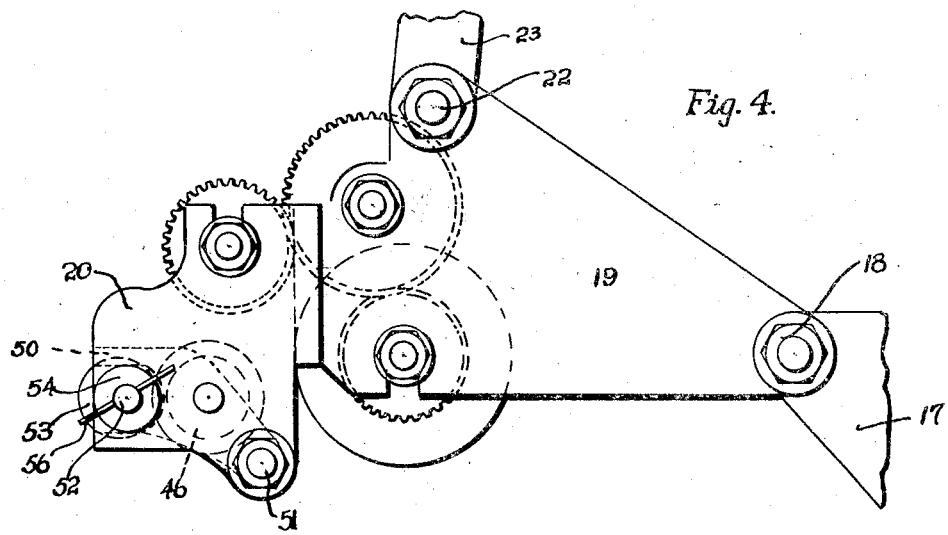
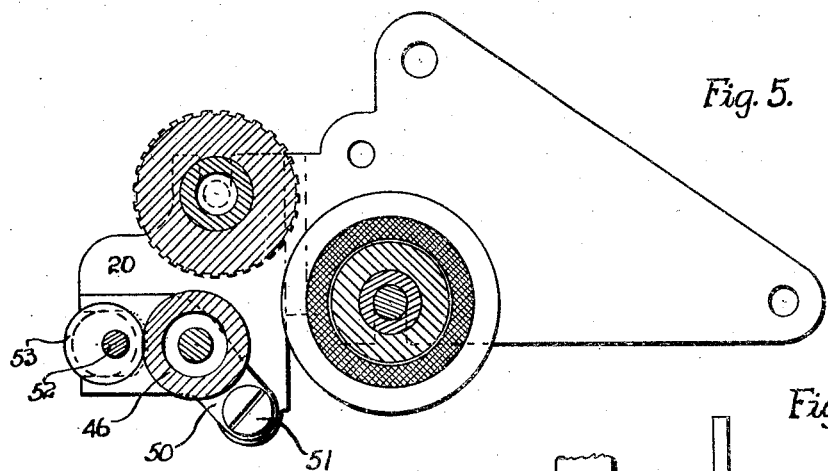
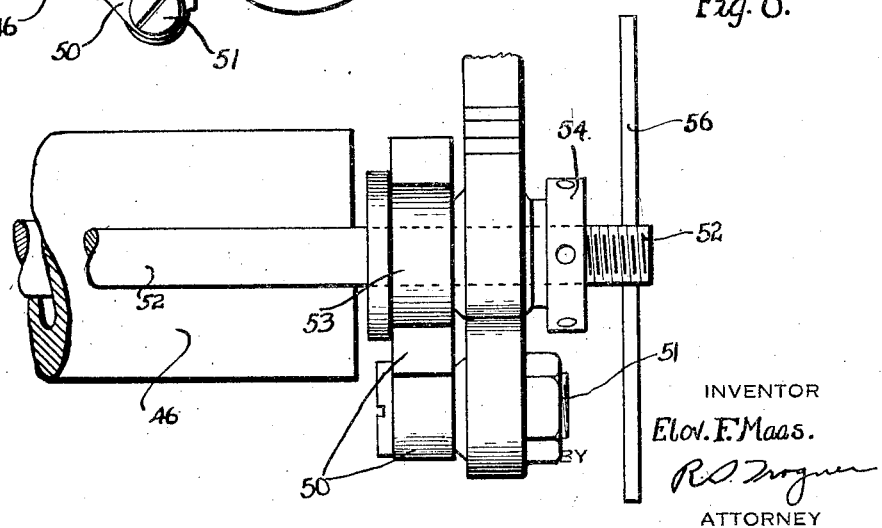

Patented May 15, 1928.

1,669,620.

UNITED STATES PATENT OFFICE.

ELOV F. MAAS, OF AKRON, OHIO, ASSIGNOR TO THE GOODYEAR TIRE & RUBBER COMPANY, OF AKRON, OHIO, A CORPORATION OF OHIO.

TREAD-APPLYING DEVICE.

Application filed June 30, 1926. Serial No. 119,607.

My invention relates to tire building machines and it has particular relation to that portion of a tire building machine which is employed in applying tread bands to the carcass of a tire.

One object of my invention is to provide a device for applying a tread band evenly to the mandrel or core of a tire building machine.

Another object of the invention is to provide a device for initially shaping the tread band before it is applied to the core.

It is a further object of my invention to provide a device that is simple in construction and operation and which is capable of performing the aforementioned objects.

In manufacturing tires according to the so-called "core-built" method, it is the practice to superimpose upon a rotatable mandrel several plies of rubberized fabric as well as to position a set of beads, chafing strips and a breaker thereon. Subsequently the tread band is applied. As it is received from the calender the tread is in the form of a flat band, whose length is nearly equivalent to the circumference of the core. Obviously, in order that this flat, relatively stiff material be made to assume the contour of a tire wholly free from air pockets and wrinkles, necessitates that the operator be both experienced and skillful in manipulating the same. According to the former practice the band was centered about the core, after which the edges were caused to enclose it. The procedure entailed difficulties and consumed considerable time.

According to my invention I have provided a device which will stretch the central portion of the band and thereafter stitch it to the core. It is this portion of the band that will coincide with the outer periphery or circumference of the tire. At the same time, however, the length of the side portions of the band remains unchanged and will, therefore, conform more readily with the lateral portions of the core which are of lesser circumference.

My invention will be more easily understood by referring to the drawings in which:

Fig. 4 is a side view of a tread applier such as illustrated in Fig. 1, embodying certain modifications thereover;

Fig. 5 is a sectional view of the embodiment illustrated in Fig. 4, taken along a line corresponding to III—III in Fig. 1; and Fig. 6 is a detail plan view, on a somewhat larger scale, of the nip roll illustrating its adjustable feature.

Figure 1:
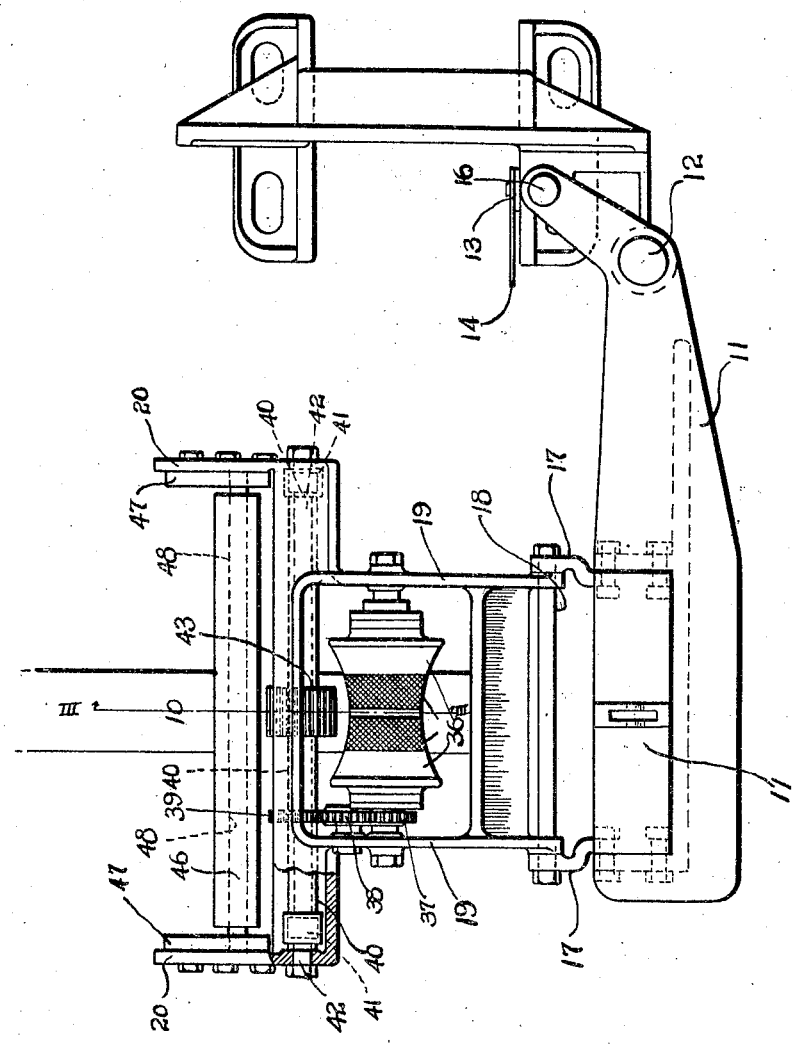
Fig. 1 is a plan view of a tread applier embodying the principles of my invention, which is shown in operative relation with respect to a core of a tire building machine.

A tire building machine includes, among other mechanisms, a power driven core or mandrel 10, upon which the elements constituting the tire are assembled. In addition, it may include various stitching and trimming members which are unimportant to the understanding of the present invention. The tread applying device is positioned on or near the tire building machine to meet the convenience of the operator. In the embodiment illustrated it is supported upon an arm 11 which is pivoted about a pin 12 in the frame of the tire building machine.

To secure the arm supporting the device in an operable position with respect to the core, a latch 13 of conventional design is provided which is secured to the frame and is operated by a handle 14. The latch maintains the arm 11 in position by engaging an opening 16 in the arm provided therefor.

Two bracket members 17 are bolted to the free end of the arm 11. A pin 18 is supported by these members about which is pivoted a symmetrical journal casting 19 having a pair of extended arm members 20. A rod 22 extends between the opposite arms of the casting to which is pivotally secured one end of a link 23 having a lug member 24 secured thereto. The other end is freely pinned to a link 26, which is pivoted in a projected portion of the arm 11. One end of a slotted bar 27 is pivotally secured to the link 26 and rests freely upon the lug 24. There is affixed to the bar a small bell crank member 28, one end of which guards the opening of the slotted portion of the bar 27 and the other end is connected to a push rod 29. This rod passes through a guide member 31 that is joined to the bar. A coil spring 32 incloses a portion of the rod and rests against the guide urging the rod outwardly.

Figure 2:
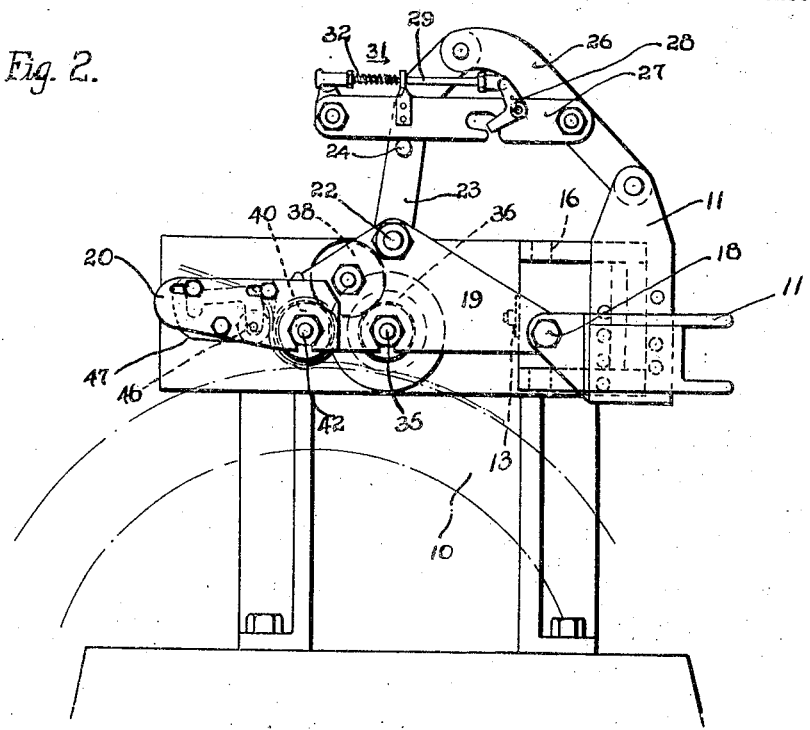
Fig. 2 is a side view of the structure illustrated in Fig. 1.

This portion of the device is not important to the operation of the tread applier but facilitates disposing it in an operative or inoperative position. Any other suitable arrangement of elements may be employed which is capable of promoting this function. As shown in Fig. 2, the device is in operative relation with respect to the core. By pivoting the journal casting upwardly about pin 18 the bar 27 will slide along the lug 24 until the latter enters the slot. The bell crank 28 thereafter locks the lug so that the vibration of the machine will not disengage the slot in the bar 27 from the supporting lug. In order to lower the device the push rod 29 is moved in the direction indicated by the arrow, thereby pivoting the bell crank clockwise against the force of the spring. Thereafter the lug may be freed of the slot and the journal casting accordingly pivoted downwardly.

The tread band applying elements are rotatably supported in the journal casting. They include a shaft 35 bearing a plurality of independent frustrum like elements 36, the central elements of which have nurled surfaces and are keyed to the shaft 35, whereas the outer elements are smooth and are freely mounted thereon. These form a concave stitcher roll which engages the core 10. A pinion 37 is keyed to the shaft 35 and meshes with an idler gear 38 that is rotatably supported from the journal casting and drives pinion 39 which is keyed to a hollow feed roll shaft 40. Within the ends of this shaft are ball bearings 41 each of which contains a rod 42 that is supported by the arms 20 of the casting 19.

In line with the nurled frustrum-like elements and keyed to the shaft 40 is a collar 43 which is adapted to engage the central portion of a tread band 44. The collar is of a smaller diameter than the nurled frustrum segments and is adapted to feed the tread band to the conical stitcher roll at a rate which is less than the peripheral speed of the core. Adjacent and parallel to the feed roll shaft is an auxiliary roll 46 which is rotatably supported on a shaft 48. According to the embodiment illustrated in Fig. 3, the shaft rests in the slots of the plate members 47 which are bolted to the casting arms 20.

Figure 3:
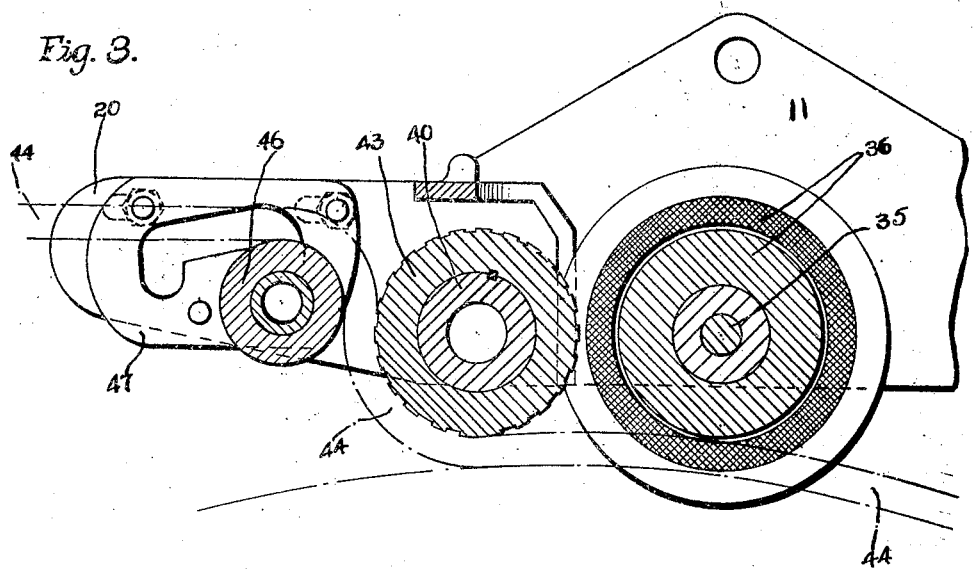
Fig. 3 is a sectional view taken substantially along the line III—III in Fig. 1.

To apply a tread the arm 11 is latched in position, after which the casting is pivoted downwardly thereby assuming the position illustrated in Fig. 3 according to which the nurled stitcher segments 36 rest upon the core and support the entire weight of the device. The operator slides the auxiliary roll 46 away from the adjacent feed roll in order to insert the end of a tread band. The band is conducted over the roll 46 under the feed roll 40 and thereafter directly to the stitcher 36. As soon as the initial portion of the band engages the core beneath the stitcher, the auxiliary roll 46 is caused to move into operative relation with the roll 40, thereby nipping the band securely between itself and the collar 43 in the manner illustrated in Fig. 3. Since the feed collar is of lesser circumference than the nurled stitcher and the ratio of the gears 37 and 39 which interconnect the two shafts is 1:1, the band will be stretched proportionally. Thereafter, without permitting the stretched band to relax and assume its initial flat condition, it is stitched immediately to the core. After the core has been rotated a single revolution the casting member 19 is pivoted upwardly until the lug 24 enters the slot in the bar 27, after which the arm 11 is unlatched and pivoted away from the drum.

According to the modification illustrated in Figs. 4, 5, and 6, the conical stitcher and feed rolls are substantially unchanged but the auxiliary or nip roll 46 differs. This embodiment includes a set of bifurcated arms 50 which are pivoted about a rod 51 whose ends are supported by the pivotably mounted casting 19. The ends of the nip roll 46 are rotatably mounted in the bifurcated arms. A rod 52, which is provided with threads at both ends, is supported in the journal castings. Adjacent the casting member and keyed to the rod 52 is an eccentric collar 53 which is positioned within the bifurcated portions of each of the arm members 50. Nuts 54 are screwed tightly on the ends of the rods, thereby securing them against rotation. It will be noted that by turning the rod the eccentrics 53 will be rotated which will in turn pivot the bifurcated arms 50 together with the nip roll 46, that is supported thereby. Any desired position of the eccentric roll may be maintained by keeping the nuts 54 tight. To facilitate rotary adjustment of the rod a pin 56 is secured in one end thereof. The proper relationship between the nip roll and the feed roll is established by loosening nuts 54 and rotating the rod 52 to which is keyed the eccentric 53, until the desired distance between the nip and feed rolls is effectuated. Subsequently the cam is secured in this position by again tightening the nuts.

The operation of this embodiment is similar to that of the former in most particulars. It differs, however, in that the band is fed to the applier while the core 10 is rotated. Under these conditions the feed roll 40 grips the end of the band 44, thereby conducting it directly to the stitcher roll. The device has an advantage in that the distance between the nip roll and the feed roll is always constant, although adjustably so. Moreover, the stretching action is imparted to the band throughout its length, leaving no untreated end portions as is true of the embodiment illustrated in Figs. 1, 2 and 3.

It will be observed that by employing the device it is possible to apply the flat band of tough, relatively stiff rubber composition to a core with little or no difficulty. The shaping elements being driven from the source of power do not require a laborious manual operation. The distortion to which the central portion of the tread is subjected may be varied either by changing the gear ratio or the diameter of the feed and stitcher rolls, or both. Obviously, many modifications are possible which embody the principles hereinabove set forth and I desire, therefore, that my invention be limited only to accord with the prior art and the appended claims.

What I claim is:

1. The combination with a tire building machine having a rotatable core of a tread band applying device comprising a stitcher member adapted to engage the core and means in operative relation therewith for supplying the tread thereto and stretching the mid portion thereof, while leaving the edges unstretched.

2. The combination with a tire building machine having a rotatable core, of a tread band applying device comprising a concave stitcher roller in engagement with the core, a tread band feed roll positively driven by and mounted at the rear thereof at a peripheral speed less than that of the core and an auxiliary roll adjustably disposed with respect to the feed roll adapted to press the tread band into frictional contact between the tread band and the feed roll, said feed roll and auxiliary roll being arranged to deliver the tread band directly between the core and the stitcher roller.

3. The combination with a tire building machine having a core, of a device for applying tread bands to the core including a stitcher member driven by engagement with the core, a band feed roll juxtapositioned thereto for delivering the tread bands directly between the core and the stitcher member, a nip roll adapted to effect intimate engagement of the tread band with the feed roll, and means permitting the ready separation of the latter rolls to facilitate the insertion of tread bands.

4. The combination with a tire building machine having a rotatable core of a device for applying tread bands to the core comprising a rotatable stitcher member in frictional engagement with the core adapted to stitch the band to the core and two cooperative band feed roller members having relatively movable axes positioned adjacent the stitcher roll being adapted to receive a band therebetween and to maintain frictional engagement therewith, the feed roller being arranged to deliver the tread band directly between the core and the stitcher member, at least one of said roller members being driven by the stitcher roll at a peripheral speed less than that of the core.

5. The combination with a tire building machine having a core, of a device for applying tread bands to the core, including a stitcher member driven by engagement with the core, a band feed roll juxtapositioned thereto, engageable with the central portion of the band and adapted to supply the band at a linear rate less than the periperal speed of the core, a nip roll disposed adjacent the feed roll adapted to insure frictional engagement between the band and the roll, and means for varying the distance between the nip roll and the feed roll.

6. The combination with a tire building machine having a core, of a device for applying tread bands to the core including a concave stitcher roll mounted upon a shaft, said stitcher roll being composed of freely rotatable end sections and intermediate sections rigidly connected with the shaft and rollers connected to and driven by said shaft for feeding tread bands to the stitcher roller at a linear speed slightly less than the peripheral speed of the intermediate sections of the stitcher roll, whereby the intermediate portion of the band is stretched, while leaving the edge portions substantially unstretched.

7. The combination with a tire building machine having a rotatable core, of a device for applying tread bands to the core including a horizontally swingable arm, a vertically swingable frame secured to the free end of said arm, a stitcher roll rotatably mounted within the frame, feed rolls positioned in the frame adjacent the stitcher roll, toggle links pivotally connecting the horizontally swingable arm and the vertically swingable frame, and latch means secured to the links and adapted to secure them in position to hold the vertically swingable frame out of engagement with the rotatable core.

8. The combination with a tire building machine having a core, of a device for applying tread bands to the core including an arm pivoted to the frame of the machine, a second arm pivoted upon the swinging end of the first mentioned arm, a stitcher roller mounted upon the second arm and adapted to engage the core, a feed roller positioned at one side of the stitcher roller, a driving connection between the two rollers adapted to drive the latter roller at a slightly less peripheral speed than the first mentioned roller, a nip roller positioned adjacent the feed roller and means permitting the nip roller to be readily moved toward or away from the feed roller in order to permit the tread band to be inserted therebetween and then pressed against the feed roller, the nip roller and the feed roller being so positioned with respect to the stitcher roller that the tread band is delivered directly between the core and the stitcher roller.

In witness whereof, I have hereunto signed my name.

ELOV F. MAAS.